June 13, 1939.  R. D. EVANS  2,162,531
GROUND-FAULT PROTECTION
Filed April 24, 1937
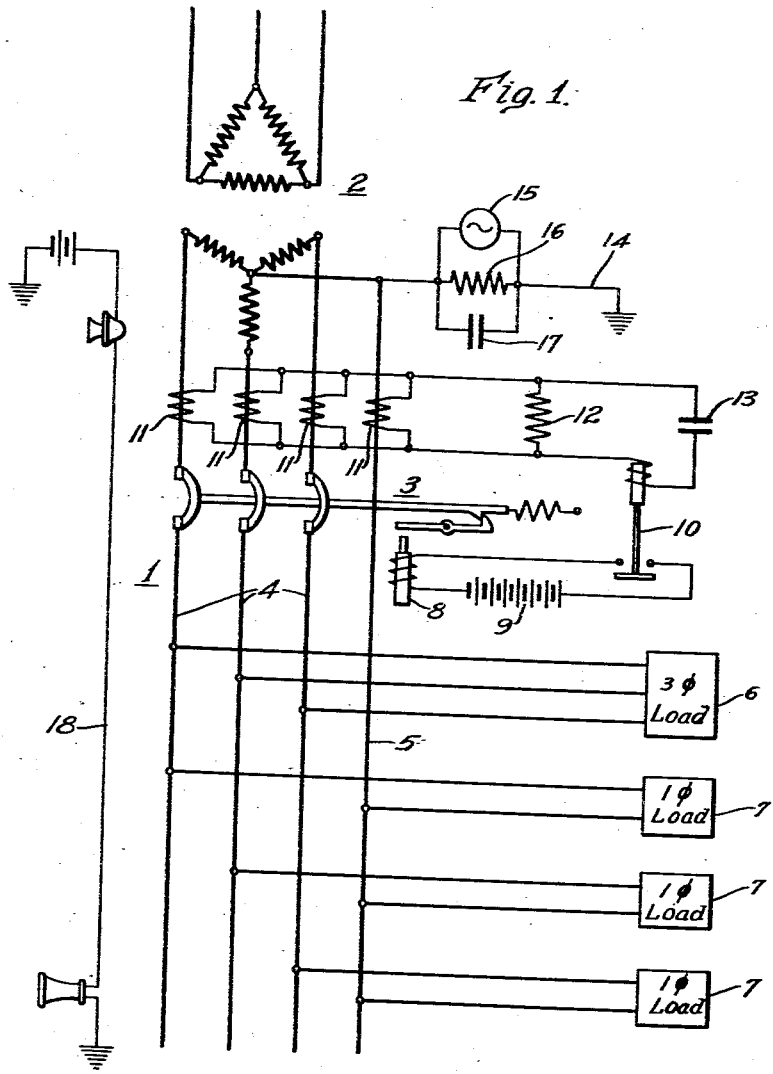
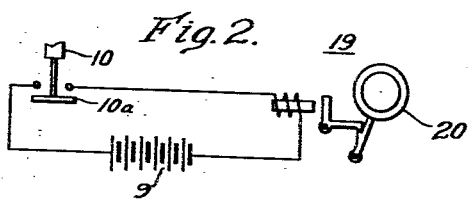
WITNESSES:
C. J. Weller.
G. O. Harrison
INVENTOR
Robert D. Evans.
BY
Waltman
ATTORNEY Patented June 13, 1939

2,162,531

UNITED STATES PATENT OFFICE 2,162,531

GROUND-FAULT PROTECTION

Robert D. Evans, Swissvale, Pa., assignor to Westinghouse Electric & Manufacturing Company, East Pittsburgh, Pa., a corporation of Pennsylvania Application April 24, 1937, Serial No. 138,798

9 Claims. (Cl. 175—294)

My invention relates to protective apparatus for use in alternating-current systems of transmission and distribution, and particularly to ground fault protective apparatus for use on alternating current power circuits which are grounded at a single point.

Although not limited thereto, my invention is particularly applicable to the detection or clearing of ground faults on distribution feeders of the type which are grounded at one point and which have a neutral conductor carried along with the phase conductors. Such distribution circuits are commonly carried on the same poles as telephones or other communication circuits, and are subject to ground faults caused by the contact of one of the power conductors or the neutral conductor with one of the telephone or other communication circuits. In the event of such a ground fault, the disturbance to system conditions on the power circuit may be so small as to fail to operate the protective devices for the power circuit, and the grounded condition may escape detection for a long time. In the meanwhile, a telephone subscriber may come in contact with the faulted telephone conductor, and a fatal accident may result. In an analysis of a number of such accidents, it has been found that casualties result almost entirely from such grounds which are permitted to exist for long periods of time, and that if the fault condition can be cleared within a matter of minutes or even a few hours after the initial contact, the majority of these accidents can be prevented.

A somewhat similar condition exists where overhead distribution circuits are extended through low density and rural distribution areas under conditions such that the current flow to a ground fault may be insufficient to operate the line protective devices. In such a situation, a conductor may be down from one of the poles and lying upon the ground for a great length of time, and may be approached and touched by someone unaware of the danger, with a consequent accident.

It is an object of my invention to provide a novel ground-fault-detecting device for use on circuits of the character indicated, which will respond to ground faults which produce insufficient change in system conditions to affect the operation of the usual protective devices.

Another object of my invention is to provide a novel ground-fault-detecting device for circuits of the type indicated, which will not respond to a phase-to-phase or phase-to-neutral short-circuit of the protected circuit.

Other objects of my invention will become evident from the following detailed description, taken in conjunction with the accompanying drawing, in which:

Figure 1 is a diagrammatic view of a protective installation embodying my invention; and Fig. 2 is a diagrammatic view of an indicating system which may be used in the practice of my invention.

Referring to Figure 1, in detail, a polyphase alternating-current power circuit 1 is connected to a suitable source such as a bank of transformers 2, to be energized by polyphase alternating-current power of any usual frequency, such as 25 or 60 cycles. A circuit breaker 3 is interposed in the power circuit 1, for interrupting the flow of power to the circuit 1 in the event of a fault on the latter, in accordance with the usual practice.

The alternating-current power circuit 1 consists of three phase conductors 4 and a neutral conductor 5, which is carried along with the phase conductors in overhead construction. Polyphase loads may be drawn from the three phase conductors as indicated at 6, and single phase loads may be drawn between any of the phase conductors 4 and the neutral conductor 5, as indicated at 7.

The circuit breaker 3 may be of any suitable type, and is provided with a suitable trip device 8 which may be connected in a local circuit with a storage battery 9 and the contact members of an over-current relay 10.

A separate current transformer 11 is provided for each of the phase conductors 4 and for the neutral conductor 5, and the secondary circuits of the transformers 11 are connected so that the currents therein add algebraically. The energizing coil of the over-current relay 10 is connected to respond to the sum of the output currents of the current transformers 11. Preferably, a tuning inductance 12 and a tuning capacitor 13 are connected in circuit with the coil of the over-current relay 10, in order to accentuate the response of the relay 10 to a superimposed frequency, higher than the normal power frequency, which is applied to the circuit 1 by means of a suitable source 15.

The source 15 is preferably included in a conductive connection 14 between the power circuit 1 and ground, but may be connected in any other way effective to maintain the carrier voltage between the entire power circuit and ground. A tuning inductance 16 and a tuning capacitor 17 may be connected in parallel relationship to the source 15, in order to provide a high impedance to the superposed frequency currents, but permit relatively free flow of power frequency current to ground.

The tuning inductance 12, and tuning capacitor 13, and the coil of relay 10 are preferably so designed as to produce resonance at the superimposed frequency. Similarly, the tuning inductance 16 and the tuning capacitor 17 are designed or adjusted to produce resonance at the superposed frequency. The superposed frequency may be of the order of 600 cycles a second, or may be of a considerably higher order such as 10 to 60 kilocycles. I prefer, however, to avoid the band of frequencies in the neighborhood of 1100 cycles, which has proved to be most disturbing to telephone communication.

The operation of the apparatus shown in Fig. 1 may be set forth as follows: During normal conditions of the power circuit 1, power currents flow from the bank of transformers 2 to the various loads 6 and 7, and the entire circuit 1 is energized by high frequency voltage supplied by the source 15. However, substantially no current of the superposed frequency flows, as the circuit through the phase conductors 4 and neutral conductor 5 to ground is open and is completed only by the relatively small capacitance of these conductors to ground.

If a phase to phase short-circuit occurs between two or more of the line conductors 4, or if a short circuit occurs between one of the line conductors 4 and the neutral conductor 5, relatively large power currents may flow through the fault, but the algebraic sum of all of these currents in the conductors 4 and 5 will be approximately zero, so that no operation of the relay 10 will result. Such a short circuit would be cleared by the usual fault responsive relays (not shown).

If one of the line conductors 4 or the neutral conductor 5 becomes grounded, however, a circuit will be completed for high frequency current flow from the source 15, and the flow of such currents will be greaty increased. Because of the polarity relationships of the current transformers 11, such high frequency currents passed by the circuit 1 do not cancel out in the same manner as normal power frequency currents, and a considerable flow of high frequency current is present in the resonant circuit consisting of the tuning elements 12 and 13 and the coil of relay 10. The relay 10 accordingly operates to trip the circuit breaker 3.

Instead of directly opening the circuit, as in Fig. 1, the overcurrent relay 10 may be utilized to operate any suitable signal device, so that the grounded condition of the circuit may be ascertained, and repairmen sent out to repair the faulted line. A signaling circuit of this type is shown in Fig. 2, in which any suitable signaling device 19 is arranged to be operated upon closure of the contact members 10a of the relay 10. In the apparatus shown in Fig. 2, the signaling device 19 includes a gravity operated target 20 which is released upon operation of the relay.

I do not intend that the present invention shall be restricted to the specific structural details, arrangement of parts or circuit connections herein set forth, as various modifications thereof may be affected without departing from the spirit and scope of my invention. I desire, therefore, that only such limitations shall be imposed as are indicated in the appended claims.

I claim as my invention:

1. In an alternating-current system of transmission and distribution operated at a predetermined power frequency, an alternating-current power circuit comprising a plurality of conductors; a conductive connection of said circuit to ground at a single point; means for impressing a voltage to ground, of frequency higher than said power frequency, upon all of said conductors as a group; an electroresponsive fault-detecting device; and means for energizing said device in accordance with the algebraic sum of currents flowing in all of said conductors, said device being operative to detect a change in energy at said higher frequency in the system when a ground occurs on any one of said conductors.

2. In an alternating-current system of transmission and distribution operated at a predetermined power frequency, an alternating-current power circuit comprising a plurality of conductors; a conductive connection of said circuit to ground at a single point; means for impressing a voltage to ground, of frequency higher than said power frequency, upon all of said conductors as a group; an individual current transformer energized from each of said conductors; and an electro-responsive fault-detecting device connected to said current transformers in such manner as to respond to the algebraic sum of currents in all of said conductors; said device being operative to detect a change in energy at said higher frequency in the system when a ground occurs on any one of said conductors.

3. In an alternating-current system of transmission and distribution operated at a predetermined power frequency, an alternating-current power circuit comprising a plurality of conductors; a conductive connection of said circuit to ground at a single point; a source of voltage of higher frequency than said power frequency included in said connection; an electroresponsive fault-detecting device; and means for energizing said device in accordance with the algebraic sum of currents flowing in all of said conductors; said device being operative to detect a change in energy at said higher frequency in the system when a ground occurs on any one of said conductors.

4. In an alternating-current system of transmission and distribution operated at a predetermined power frequency, an alternating-current power circuit comprising a plurality of conductors; a conductive connection of said circuit to ground at a single point; a source of voltage of higher frequency than said power frequency included in said connection; an individual current transformer energized from each of said conductors; and an electro-responsive fault-detecting device connected to said current transformers in such manner as to respond to the algebraic sum of currents in all of said conductors; said device being operative to detect a change in energy at said higher frequency in the system when a ground occurs on any one of said conductors.

5. In an alternating-current system of transmission and distribution operated at a predetermined power frequency, an alternating-current power circuit comprising a plurality of conductors; a conductive connection of said circuit to ground at a single point; a source of voltage of higher frequency than said power frequency included in said connection; an individual current transformer energized from each of said conductors; a tuned circuit resonant at said higher frequency and connected to said current transformers in such manner as to segregate the algebraic sum of currents of said higher frequency in all of said conductors; and an electro-responsive fault-detecting device energized from said tuned circuit; said device being operative to detect a change in energy at said higher frequency in the system when a ground occurs on any one of said conductors.

6. In an alternating-current system of transmission and distribution operated at a predetermined power frequency, an alternating-current power circuit comprising a plurality of conductors; a conductive connection of said circuit to ground at a single point; a source of voltage of higher frequency than said power frequency included in said connection; impedance means having relatively low impedance to currents of said power frequency and relatively high impedance to currents of said higher frequency included in said connection; an individual current transformer energized from each of said conductors; a tuned circuit resonant at said higher frequency and connected to said current transformers in such manner as to segregate the algebraic sum of currents of said higher frequency in all of said conductors; and an electro-responsive fault-detecting device energized from said tuned circuit; said device being operative to detect a change in energy at said higher frequency in the system when a ground occurs on any one of said conductors.

7. In an alternating-current system of transmission and distribution operated at a predetermined power frequency, a polyphase alternating-current circuit comprising a plurality of line conductors and a neutral conductor; a conductive connection of said neutral conductor to ground at a single point; means for impressing a voltage to ground, of frequency higher than said power frequency, upon all of said conductors as a group; an electro-responsive fault-detecting device; and means for energizing said device in accordance with the algebraic sum of currents flowing in all of said conductors; said device being operative to detect a change in energy at said higher frequency in the system when a ground occurs on any one of said conductors.

8. In an alternating-current system of transmission and distribution operated at a predetermined power frequency, a polyphase alternating-current circuit comprising a plurality of line conductors and a neutral conductor; a conductive connection of said neutral conductor to ground at a single point; a source of voltage of higher frequency than said power frequency included in said connection; an individual current transformer energized from each of said conductors; and an electro-responsive fault-detecting device connected to said current transformers in such manner as to respond to the algebraic sum of currents in all of said conductors; said device being operative to detect a change in energy at said higher frequency in the system when a ground occurs on any one of said conductors.

9. In an alternating-current system of transmission and distribution operated at a predetermined power frequency, a polyphase alternating-current circuit comprising a plurality of line conductors and a neutral conductor; a conductive connection of said neutral conductor to ground at a single point; a source of voltage of higher frequency than said power frequency included in said connection; an individual current transformer energized from each of said conductors; a tuned circuit resonant at said higher frequency and connected to said circuit transformers in such manner as to segregate the algebraic sum of currents of said higher frequency in all of said conductors; and an electro-responsive fault-detecting device energized from said tuned circuit; said device being operative to detect a change in energy at said higher frequency in the system when a ground occurs on any one of said conductors.

ROBERT D. EVANS.